United States Patent [19]
Heiderer

[11] 3,854,040
[45] Dec. 10, 1974

[54] MOTOR VEHICLE LAMP ASSEMBLY

[75] Inventor: Fred G. Heiderer, Grand Blanc, Mich.

[73] Assignee: General Motors Corporation, Detroit, Mich.

[22] Filed: Aug. 6, 1973

[21] Appl. No.: 386,009

[52] U.S. Cl. .................. 240/7.1 R, 240/8.3, 240/47
[51] Int. Cl. .......................... B60q 1/00, B60q 3/00
[58] Field of Search .................... 240/7.1 R, 47, 8.3

[56] References Cited
UNITED STATES PATENTS
3,325,637  6/1967  Honda .......................... 240/7.1 R

*Primary Examiner*—Richard A. Wintercorn
*Attorney, Agent, or Firm*—Peter D. Sachtjen

[57] ABSTRACT

A motor vehicle lamp assembly wherein an expandable bellows communicating with the lamp interior expands or contracts to maintain a constant interior pressure during lamp operation thereby preventing a negative pressure differential tending to draw moisture into the lamp interior during cool down of the lamp assembly.

1 Claim, 4 Drawing Figures

MOTOR VEHICLE LAMP ASSEMBLY

The present invention relates to motor vehicle lamp assemblies and, in particular, a lamp assembly for a motor vehicle having expandable means for minimizing pressure variations in the lamp interior.

Current motor vehicle lamp assemblies include a vehicle mounted housing to which an optical lens is secured by suitable means such as mechanical fasteners, adhesives or welding. A lamp bulb disposed interior of the lamp assembly provides the desired lighting function. When the bulb is illuminated, the resultant heating of the contained air causes the interior pressure to increase significantly. Any leakage paths due to incomplete sealing between the lamp components will permit relief of this pressure buildup. Upon cool down of the lamp assembly, the pressure in the lamp cavity will decrease and if a significant leakage has occurred, will drop below atmospheric pressure. This negative pressure differential will draw atmospheric air into the lamp interior. In installations subject to moisture exposure by spray or drain off from the vehicle, water or moisture laden air can be drawn into the lamp interior during cool down. This moisture can cause corrosion of the bulb components and resultant lamp failure.

The present invention provides a positive means for minimizing pressure variations during lamp operation. This prevents negative pressure differentials in the lamp assembly tending to cause the aforementioned water and moisture laden air ingress to the lamp interior. These features are obtained by mounting an accordion pleated bellows on the lamp housing. The bellows has an expandable chamber fluidly communicating with the lamp interior. As the pressure builds up in the lamp interior, the bellows expands to increase the contained air volume thereby relieving the pressure buildup. By eliminating the pressure differential between atmosphere and the interior, the contained air volume remains substantially constant during operation. Therefore as the lamp temperature decreases, the expandable bellows contracts to reduce the air volume while maintaining a substantially constant pressure. This prevents any negative pressure differentials and thereby eliminates the ingress of water or moisture laden air.

These and other features of the present invention will be apparent to one skilled in the art upon reading the following detailed description, reference being made to the accompanying drawings illustrating a preferred embodiment in which.

Figure 1:
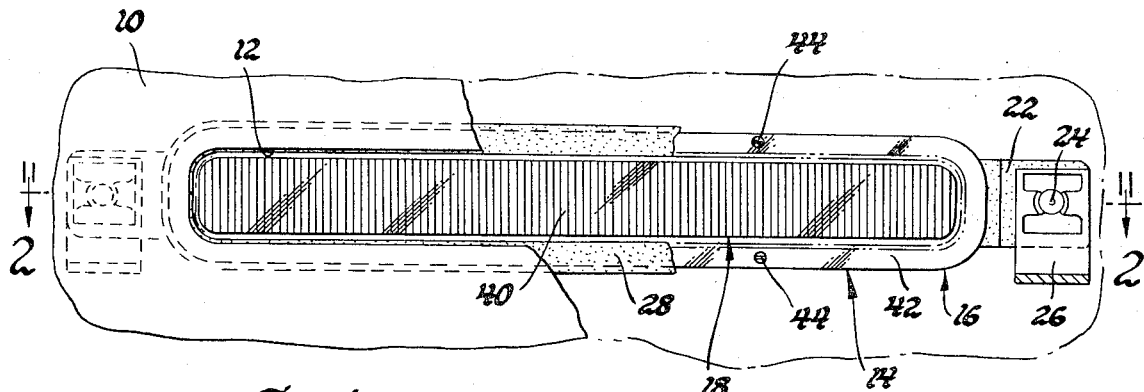
FIG. 1 is an elevational view with portions broken away of a lamp assembly made in accordance with the present invention mounted on a motor vehicle.
Figure 2:
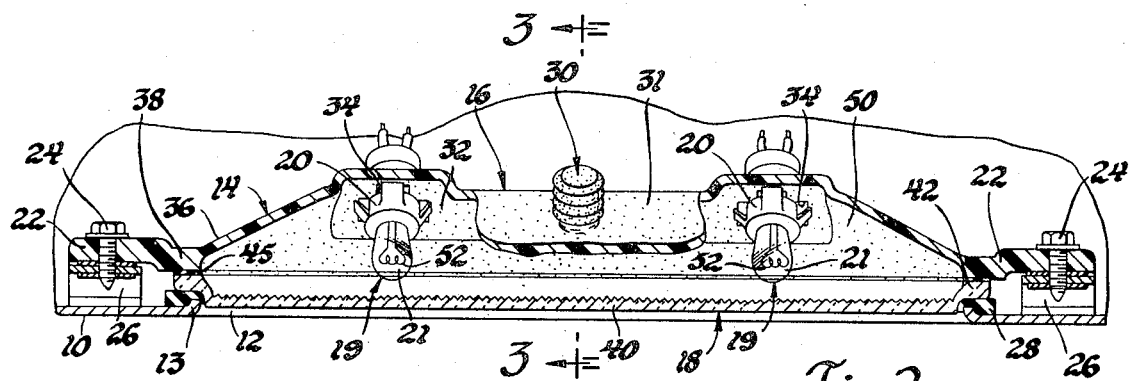
FIG. 2 is a view taken along line 2—2 of FIG. 1.
Figure 3:
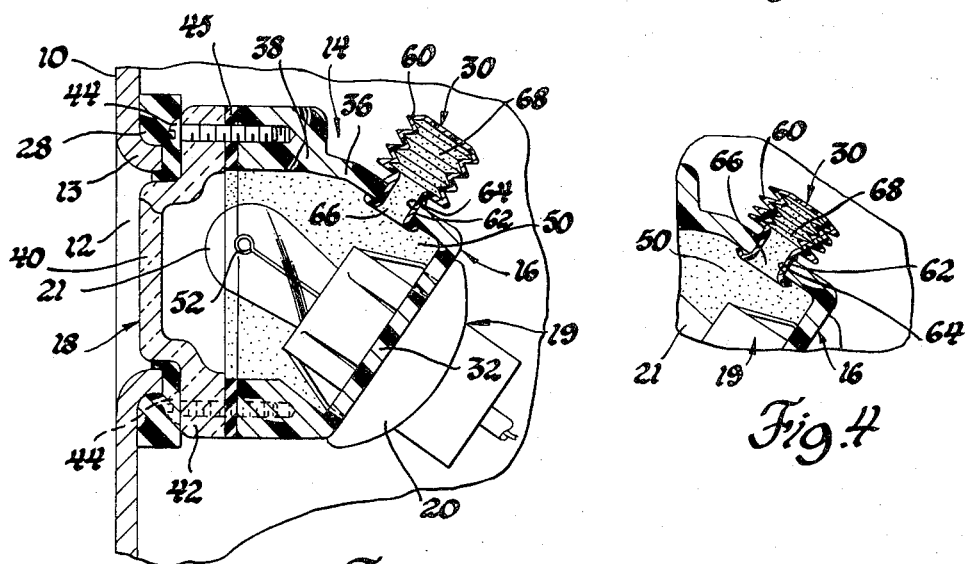
FIG. 3 is an enlarged view taken along line 3—3 of FIG. 2 showing the expandable bellows mounted on the lamp housing and showing the bellows in the expanded condition.
Figure 4:
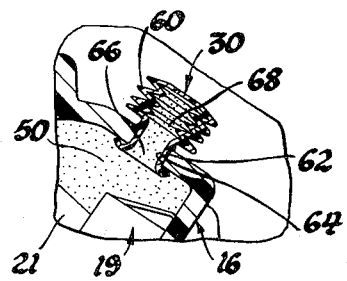
FIG. 4 is a fragmentary view showing the expandable bellows in the contracted condition.

Referring to the drawings, there is shown a motor vehicle body component such as a bumper 10 having a generally rectangular opening 12 defined by an inwardly turned lip 13. A backup lamp assembly 14 made in accordance with the present invention is fixedly mounted behind the opening 12. The backup lamp assembly 14 provides rearward illumination whenever the vehicle is conditioned for reverse motion. However, it will be appreciated that the present invention is equally adaptable for all motor vehicle lighting, such as parking, stop, license, turn signal, side marker, and cornering lamp applications.

The lamp assembly 14 generally comprises a housing 16, a lens 18, and a pair of laterally spaced lamps 19, each of which comprises a twist-in socket 20 and a bulb 21. The housing 16 includes a pair of laterally extending mounting lugs 22 which are mechanically secured by fasteners 24 to brackets 26 affixed to the interior surface of the bumper 10. In assembly, a gasket 28 adhesively carried on the front peripheral surface of the lens 18 compressively engages the rear surface of the bumper 10 adjacent the lip 13 to seal the lamp assembly 14 at the opening 12.

The lamp assembly 14 in operation may be exposed to severe moisture conditions which can occur as a result of moisture spray or water run-off from the vehicle body. When a negative pressure differential exists between the lamp interior and the exterior, this moisture can be drawn inwardly through any leakage paths between the lamp components. This can cause corrosion of the lamp elements and resultant lamp failure. To minimize these pressure variations, the subject lamp assembly 14 includes a housing mounted expandable accordion pleated bellows 30 hereafter described in greater detail.

The housing 16 is molded from a suitable plastic material although different materials such as zinc, aluminum, or plated diecastings, or metallic stamping are equally usable. The housing 16 includes a dish shaped reflector 31 from which the mounting lugs 22 laterally extend. The reflector 31 includes an inclined rear wall 32 having a pair of laterally spaced irregularly shaped lamp openings 34. The socket 20 and the lamp bulb 21 are the type disclosed in U.S. Pat. No. 3,559,152 entitled "Lamp Socket Panel Assembly", filed June 7, 1968 in the name of Warren Pearce, Jr. assigned to the assignee of the present invention. The lamp 19 is inserted through the opening 34 and twisted into place to fixedly mount the lamp 19 on the rear wall 32. The housing 16 further includes a peripheral wall 36 circumscribing the rear wall 34. The wall 36 frontally terminates with an outwardly extending rim 38.

The lens 18 is a molded transparent plastic material and includes a central rectangularly shaped optical section 40 which includes suitable flutes or facets for selectively distributing illumination from the light bulb 21. A peripheral flange 42 bounds the optical section 40 and mates with the peripheral rim 38 of the housing 18. A gasket 45 mates with the flange 42 and the rim 38. A plurality of threaded fasteners 44 serve to attach the lens 18 to the housing 16 with the gasket 45 being compressively retained therebetween. The interior surfaces of the lens 18 and the housing 16 define a sealed lamp chamber 50 containing a volume of air at substantially atmospheric pressure.

The bulbs 21 each include a helically coiled tungsten filament 52. Each bulb 21 is conventionally connected to the vehicle electrical system. Upon conditioning of the vehicle for reverse motion, the filaments 52 are energized. The filaments 52 in addition to providing the intended illuminating function radiantly heat and increase the temperature of the contained air. The bellows 30 is operative to increase the contained air volume while maintaining a constant pressure therein. The bellows is an accordion pleated elastomeric construction having a corrugated bellows section 60 and a flanged base 62. The base 62 is pressed into an opening 64 formed in the upper wall of the housing 36. The base 62 includes an axial passage 66 leading to a bellows chamber 68 such that the latter is fluidly communicating with the lamp chamber 50.

The bellows 30 functions as a pressure regulator by expanding or contracting to vary the contained air volume to offset the constant pressure volumetric change caused by temperature changes. The bellows 30 is flexible enough to be highly responsive to pressure changes so as to impose only a minimum resistance to volumetric change. Accordingly, when the filaments 52 are illuminated, the resultant rise in the temperature of the contained air causes a volumetric expansion which is accommodated by the increased volume of the chamber 68. Accordingly, only a minimal pressure differential exists between the lamp interior and atmosphere. Thus, there is little tendency for fluid leakage. Upon deenergization of the filaments, the lamp assembly cools down and the temperature of the contained air decreases. The bellows 30 maintains a constant pressure by deflating or contracting to decrease the volume of the chamber. This avoids a negative pressure differential between the interior and atmosphere thereby preventing corrosion of lamp components due to moisture.

While the present invention has been described with reference to an accordion-type bellows positioned exterior of the lamp housing, other types of variable volume chamber constructions are also usable, the main requirement being that the volume of the lamp cavity change to offset the volumetric change for a given temperature change while maintaining a constant pressure. This thus could equally take the form of a compressable member positioned in the cavity which itself is compressed as the temperature of the air in the lamp cavity increases.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. A motor vehicle lamp assembly comprising: a lamp housing adapted to be mounted on the motor vehicle, said housing including wall means terminating with a peripheral flange mating with peripheral rim of said housing and covering said opening; a gasket between the flange and the rim; fastener means securing said lens to said housing to compressively retain the gasket between the flange and the rim to define a sealed lamp cavity containing air at substantially atmospheric pressure; first and second openings in said wall means of said housing; a lamp member carried on said housng and projecting through said first opening into said lamp cavity, said lamp member including a filament adapted to be connected to an electrical source, said filament when energized directing illumination outwardly through said lens and heating and pressurizing the contained air in said lamp cavity; and an accordion pleated bellows having an expandable chamber and a tubular flanged base with an axial passage communicating with the chamber, said bellows being directly mounted on said wall means exterior of said housing with the flanged base being press fittedly received within said second opening whereby said chamber fluidly communicating with said lamp cavity through said axial passage, said bellows expanding and contracting to vary the volume of said chamber to maintain the pressure therein substantially constant thereby preventing a pressure differential between the cavity and atmosphere tending to draw moisture into the lamp interior during cool down of the lamp assembly.

* * * * *